(12) United States Patent
Eperiesi-Beck

(10) Patent No.: US 10,805,415 B2
(45) Date of Patent: Oct. 13, 2020

(54) COMMUNICATING DATA BETWEEN COMPUTERS BY HARMONIZING DATA TYPES

(71) Applicant: eperi GmbH, Pfungstadt (DE)

(72) Inventor: Elmar Eperiesi-Beck, Weiterstadt (DE)

(73) Assignee: eperi GmbH, Pfungstadt (DE)

( * ) Notice: Subject to any disclaimer, the term of this patent is extended or adjusted under 35 U.S.C. 154(b) by 0 days.

(21) Appl. No.: 16/452,065

(22) Filed: Jun. 25, 2019

(65) Prior Publication Data

US 2020/0007639 A1 Jan. 2, 2020

(30) Foreign Application Priority Data

Jun. 28, 2018 (EP) ..................................... 18180605

(51) Int. Cl.
*H04L 29/08* (2006.01)
*H04L 12/26* (2006.01)

(52) U.S. Cl.
CPC ...... *H04L 67/2823* (2013.01); *H04L 43/0852* (2013.01); *H04L 43/16* (2013.01)

(58) Field of Classification Search
CPC .............. H04L 63/0428; H04L 63/104; H04L 61/2539; H04L 63/0245; H04L 63/0263; H04L 63/0281; H04L 63/0407; H04L 63/0414; H04L 63/0421; H04L 63/1441; H04L 63/1475; H04L 63/1483; H04L 29/08; H04L 12/26; H04L 43/0852;

(Continued)

(56) References Cited

U.S. PATENT DOCUMENTS 8,150,883 B2 * 4/2012 Stuhec .................. G06Q 30/06
707/796
8,532,110 B2 * 9/2013 McCann ................. H04L 45/34
370/392

(Continued)

FOREIGN PATENT DOCUMENTS

WO 2017161065 A1 9/2017

OTHER PUBLICATIONS

European Search Report for Application No. 18180605.0, dated Aug. 27, 2018, 9 pages.

*Primary Examiner* — Sargon N Nano
(74) *Attorney, Agent, or Firm* — Brake Hughes Bellermann LLP

(57) ABSTRACT

A computer-implemented method is used to transmit data from a first computer to a second computer using a first protocol. The computers belong to first and second computer groups. Inter-group communication is restricted to data packets with first type data. A client module of the first computer provides data packets with first and second type data. An intermediate module receives data packets from the client module and forwards data packets to a modifier module of an auxiliary computer, using a second protocol. The auxiliary computer belongs to the first computer group. The intermediate module receives modified data packets from the modifier module using the second protocol. The packets contain first type data. The intermediate module forwards the modified data packets to a protocol module on the first computer that encodes the modified data packets. The protocol module transmits encoded modified data packets to the second computer, using the first protocol.

13 Claims, 11 Drawing Sheets

(58) Field of Classification Search
CPC ......... H04L 43/16; H04L 67/28; H04L 67/23; G06F 21/62; G06F 2221/2149; H04W 12/02

See application file for complete search history.

(56) References Cited

U.S. PATENT DOCUMENTS

| | | | |
|---|---|---|---|
| 9,372,913 B2* | 6/2016 | Hartlaub | G06F 16/283 |
| 10,521,554 B2* | 12/2019 | Dominick | G16H 30/40 |
| 2007/0257923 A1* | 11/2007 | Whitby-Strevens | G09G 5/006 345/520 |
| 2007/0277160 A1* | 11/2007 | Camiel | G06F 12/145 717/136 |
| 2008/0117920 A1* | 5/2008 | Tucker | H04L 67/289 370/401 |
| 2012/0233171 A1* | 9/2012 | Richard | G06F 16/214 707/740 |
| 2013/0298221 A1 | 11/2013 | Smith et al. | |
| 2014/0337382 A1* | 11/2014 | Picht | G06F 16/2474 707/777 |
| 2014/0358846 A1* | 12/2014 | Hartlaub | G06F 16/904 707/607 |
| 2016/0232216 A1* | 8/2016 | Wurzer | G06F 16/258 |
| 2017/0109472 A1* | 4/2017 | Dominick | G06F 19/321 |
| 2017/0116436 A1* | 4/2017 | Wu | G06F 16/252 |
| 2018/0109498 A1* | 4/2018 | Singh | H04L 63/101 |

\* cited by examiner

COMMUNICATING DATA BETWEEN COMPUTERS BY HARMONIZING DATA TYPES

CROSS REFERENCE TO RELATED APPLICATION

This application claims priority under 35 U.S.C. § 119 to European Patent Application No. EP 18180605.0, filed on Jun. 28, 2018, titled "Communicating Data Between Computers By Harmonizing Data Types," which is incorporated herein by reference in its entirety.

TECHNICAL FIELD

In general, the disclosure relates to communicating data between computers; and more in particular, the disclosure relates to system, method and computer program for communicating data via protocols that are not adaptable.

BACKGROUND

First and second computers usually communicate with each other by exchanging data. Both computers can take the role of a destination computer that processes the data further. In that role, the destination computer can be part of a technical system, or the destination computer can be communicatively coupled to the technical system.

Data processing at the destination computer can be associated with risks, among them the following:
(i) Data arriving at the destination computer can cause malfunction of the technical system.
(ii) Data arriving at the destination computer can cause activities that are not desired for other reasons.
(iii) The transfer or transport via uncontrollable networks can cause risks, such as risk regarding data integrity or data privacy.

For particular destination computers, arriving data can therefore be categorized, into:
 risk data (with the further distinction into (i) malfunction-risk data, and (ii) activity-risk data) and
 no-risk data.

This classification is related to the computer in the role of the destination computer.

To mitigate the risks, it can be defined that the destination computer must not receive or process risk data. As discussed in the following, technical implementations or measures for this mitigation approach are not free of technical constraints.

In a first aspect, technical measures can limit the generation of risk data by the computers that communicate with the destination computer. In other words, risk data can be avoided at potential data origins (i.e. at the computer in a role of a data-origin computer).

In a second aspect, the computers communicate data via communication channels, and technical measures prevent certain data from entering the channel (i.e., communicating risk data to the destination computer). This second aspect has—at least two sub-aspects: protocols and access restrictions.

The computers are usually adapted to particular protocols, but the communication channel does not change the protocol. As used herein, the protocols are agnostic to the purpose of data processing at the destination computer. Therefore, the protocols are not designed to filter out risk data (or in other words, to block risk data). Risk data going through the channel remains risk data. The protocol can't be changed, for a variety of reasons. For example, the protocol engines (or protocol modules) are "black boxes" that must not be modified, to ensure proper operation of the communication channel. Modifications to the protocol create further risks that the communication does not operate any longer. In other words, attempts to make the protocols "gnostic" are not feasible.

The communication channel can comprise transition points that may filter out (or block) risk data. But this approach requires the identification of risk data according to pre-defined rules, etc. Measures are known in the art, so that only a few examples are mentioned: data access-restrictions (for computers to particular data), data access conventions, access restrictions at network-to-network connectors (implemented, for example, by firewalls).

Looking at complexity, a communication channel that merely connects a first computer with a second computer would be rather exceptional. Communication channels are usually provided by communication networks with connections between nodes that can be considered to be channels as well. The technical measures are applicable to the computers that belong to the network, but—as a further constraint—the complexity (data-origin, protocols, access restrictions etc.) rises with every computer added to the network.

Further, communication networks can comprise sub-networks or can be part of supra-networks. For example, computers can belong to organizations that usually operate internal networks (or "intranets"). While in such internal networks, the mentioned technical measures are standardized to the requirements of the organization. Moving up the network hierarchy changes the picture: protocols, access restrictions etc. become diversified. This increases the risk to propagate and to process risk data at computers that act as destination computers.

It is noted that this introduction is much simplified. Technically, a computer can assume the destination role without purpose, and for such computers, no-risk data can become risk data. Data entering the channel can be equally risky as data leaking from the channel, and so on. Technical measures take such situations into account, but at the price of ever increasing complexity.

Hence, there is a need for reducing the risks that are associated with data processing, but with technical measures that keep complexity low.

SUMMARY

According to embodiments of the present invention, the above-mentioned constraints are solved by a combination of the following:
 Data processing definitions are separated for computer groups. The definitions differentiate between risk data and no-risk data in relation to the computer that acts as the destination computer.
 Data conversion (or type harmonization) is applied for data that leaves (or that enters) a group. Therefore, data that arrives at the computer being the destination computer is no-risk data only.
 Data transformation processes can be applied to risk data to transform risk data to no-risk data by processes such as encryption, introducing pseudonyms, anonymization or tokenization.

Such separation, conversion, or transformation can be applied at the source computer or at the destination computer, depending on a risk-mitigation target (i.e., protection target).

There is a data processing definition that—in a first group—the computers can process both risk data and no-risk data, wherein data (both risk data and no-risk data) is limited to the first group (by access restrictions). Data processing comprises the data conversion according to rules. The conversion removes the risk potential from the risk data (or at least keeps the risk potential unchanged). This data processing is implemented according to the method. There is a further data processing definition that—in the second group—the destination computer can process the data without restrictions. This further definition does not require an implementation, so that modifications to existing computers are minimized.

There is an advantage that the communication between the computer groups can use an existing, type-agnostic protocol.

A computer-implemented method is provided for communicating data between a first computer and a second computer. The method can be applicable for bi-directional communication. The communication can comprise transmitting data from the first computer to the second computer (in the first direction) and—vice versa—transmitting data from the second computer to the first computer (in the second direction).

The communication between the first computer and the second computer uses a first protocol. The first computer belongs to a first computer group, and the second computer belongs to a second computer group. The inter-group communication—that is the communication between both computer groups—is restricted to communicating data packets that only contain first type data. First type data is related to the processing definitions of the computer that act as the destination computer, and first type data is no-risk data (in relation to the computer that acts as destination computer).

In case of bi-directional communication, both the first computer and the second computer are destination computers. Since the labels "first" and "second" can be replaced for the computers, the explanation concentrates to a first communication direction. The communication in the first direction—transmitting to the second computer—is therefore explained first.

The method is being implemented on the first computer, wherein the first computer comprises a client module, an intermediate module and a protocol module.

The client module (of the first computer) provides data packets that contain first type data and second type data. Second type data is risk data for the second computer. During the execution of the method (in the next steps), there will be data conversion. The conversion can limit the opportunities of the second computer to process the data, for example by limiting processing to storing. Such measures reduce the risk, the (i) malfunction risk and/or the (ii) activity risk.

The method is now explained step by step:

In a receiving step, the intermediate module (of the first computer) receives the data packets from the client module.

In a forwarding step, the intermediate module forwards the data packets to a modifier module of an auxiliary computer, using a second protocol. The auxiliary computer also belongs to the first computer group. The computers in the first computer group (i.e., the first computer and the auxiliary computer) use data processing definitions that are adapted to the risk. This can comprise the positive definition within the first group to process data by changing the data type. More in detail, the auxiliary computer changes second type data to first type data (and vice versa for the second communication direction).

In a receiving step, the intermediate module receives modified data packets from the modifier module of the third computer, using the second protocol. The modified data packets contain first type data only. Looking at the datastructure of the data packets, there is no difference between the data packets and the modified data packets. In other words, the modifier structure changes the data type for elements inside the packets, but keeps the content structure of the data packets unchanged. Keeping the structure can be advantageous for further processing the data packets, and can be advantageous for communicating them through a communication channel that remains unmodified.

In a forwarding step, the intermediate module forwards the modified data packets to the protocol module on the first computer.

In an encoding step, the protocol module encodes the modified data packets to encoded modified data packets.

In a transmitting step, the protocol module transmits the encoded modified data packets to the second computer, using the first protocol. Since both previous steps (forwarding, encoding) do not change the data type, the encoded modified data packets contain first type data only. Transmitting results in the second computer receiving the data, as first type only. This data type is suitable for being processed by the second computer, as explained at a reduced risk. In other words, inter-group communication can be restricted to communicating data packets that only contain first type data, in contrast second type data being risk data.

In view of the above-mentioned risks, the second computer is the destination computer that receives no-risk data only. The second computer can store that data. The second computer can even process the data but without changing the risk level. By processing at the destination data, no-risk data does not become risk data. Or, processing attempts (by the second computer) would result in a no-risk output. In view of the above-mentioned risk, the output can't cause (i) malfunction of technical systems and can't cause (ii) non-desired activities. Data transport risks (iii) are also mitigated. This approach can allow crossing the border of a network, even with the (first) protocol.

DETAILED DESCRIPTION

The detailed description starts by introducing writing conventions. First type data is written by Latin letters: alpha, beta, gamma, etc. Second type data is written by Greek letters: a, β, γ, etc. In view of content, alpha is identical to a, beta is identical to β and so on.

Processing first type data at the destination computer (i.e. the first or the second computer, depending on the communication direction) is possible in all situations. By definition, first type data is no-risk data.

Second type data can be risk data, such as (i) malfunction risk data, (ii) activity risk data and (iii) transport-risk data. Processing second type data at the destination computer is not allowed; with the exception that processing is allowed if the destination computer and the computer that provides the data (i.e., the data-origin computer) are in the same group.

In other words, second type data must remain within a group of computers that complies with pre-defined data-access restrictions. It would be risky to have second type data outside the group, because second type data may be create a risk if being processed by computers outside the group. The data-access restrictions are implemented by technical measures to prevent second type data from leaving the group (or from entering the group). The data-access restrictions can also be implemented to the first type data. Examples for second type data (in the activity data (ii) sub-category) include person-related data.

Computers exchange data according to data transmission protocols that do not differentiate the data types and that—for reasons as explained—do not change the data type.

The term "computer group" (or variants of this term) stands for one computer or a plurality of computers. The term "zone" stands for the computer(s) in a group with the addition of network connections etc. The term "location" (or variants of this term) stands for the logical association of computers to groups (or to zones), such as to access-restricted zones.

For convenience of explanation, drawings and description focus on a first data communication direction from the first computer to the second computer, mostly illustrated from left to right. In the block diagrams, actions in the first direction are indicated by "open" arrows. The teachings herein are also applicable to the second direction, opposite to the first direction, on the drawings mostly from right to left. The block diagrams use "closed" arrows (with black triangles).

Figure 1A:
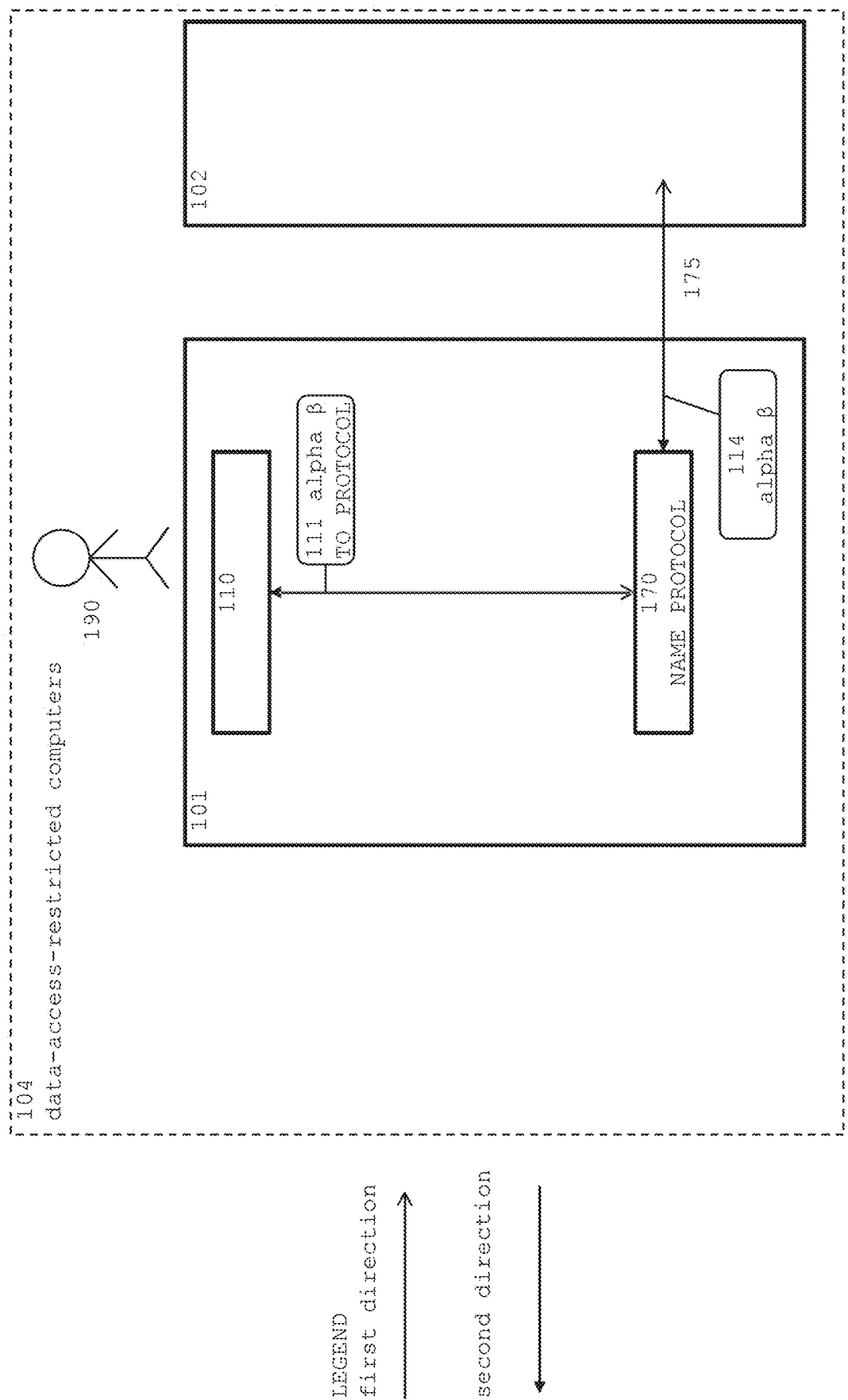
FIGS. 1A, 1B and 1C illustrate first and second computers in communication with each other and under indication of first and second protocols.

FIG. 1A illustrates first computer 101 and second computer 102 in communication via first protocol 175. A legend for open/closed arrows distinguishes the data directions. First computer 101 and second computers 102 are part of computer group 104 with data-access restrictions. The restrictions prevent (at least the) second type data from leaving the group (or from entering the group). For example, the computers of computer group 104 belong to a zone that is data-access restricted. Such restrictions can be implemented by known techniques, such as for example, by a firewall (against attacks from outside, against data leaving). The access restriction can be common to computers 101 and 102 so that the pre-defined data-access restrictions are also common. As a consequence, second type data can be exchanged between computers 101 and 102. In other words, second type data is positively defined as data that can be processed by both computers 101 and 102.

More in detail, computer 101 comprises client module 110 and protocol module 170. The description uses "client" as a label because in many scenarios, computer 101 acts as a client computer and computer 102 acts as a server computer.

Client module 110 interacts with user 190, usually a human user. Looking at the first direction (cf. the legend), client module 110 creates first type data (e.g., alpha), but also second type data (e.g., β). Client module 110 provides the data in form of data packets 111 and forwards them to protocol module 170. Client module 110 identifies protocol module 170 by techniques that are known in the art, here symbolized by a name that is given to protocol module 170: PROTOCOL. In other words, client module 110 and protocol module 170 can be part of an existing computer system.

Protocol module 170 transmits data packets 114 to second computer 102, using protocol 175. As protocol module 170 does not change the data type, data packets 114 comprise data of both types. This is in compliance with the restrictions (of group 104).

Looking at the second direction, there is data flow from computer 102 to computer 101 via protocol module 170 to client module 110 (in computer 101).

The description now gives an example by referring to a much simplified scenario. In a fictitious organization, every human member of the organization (e.g., every employee of the organization) is assigned to one or more (hardware) items like tools, mobile devices, computer equipment and so on. Item identifiers belong to first type data, and names of the human members (i.e., Alice, Robert) belong to second type data.

For example, member "Alice" is logically assigned to a computer manufactured in the year 2015 and to a display from 2005 (data packet 111), wherein member "Robert" is assigned to a computer from 2010 and to a display from 2018 (a different data packet 111). Such assignment data should be available on inventory lists that identify the members and the items. Computer 102 should run an application that checks the items for repair or replacement. For example, computer 102 would identify replacement for the old 2005-display, and for the old 2010-computer, in combination with the names (a new display for "Alice", a new computer for "Robert").

There is no (activity) risk that the names leave the organization, due to the technical implementations of the access restrictions.

Figure 1B:
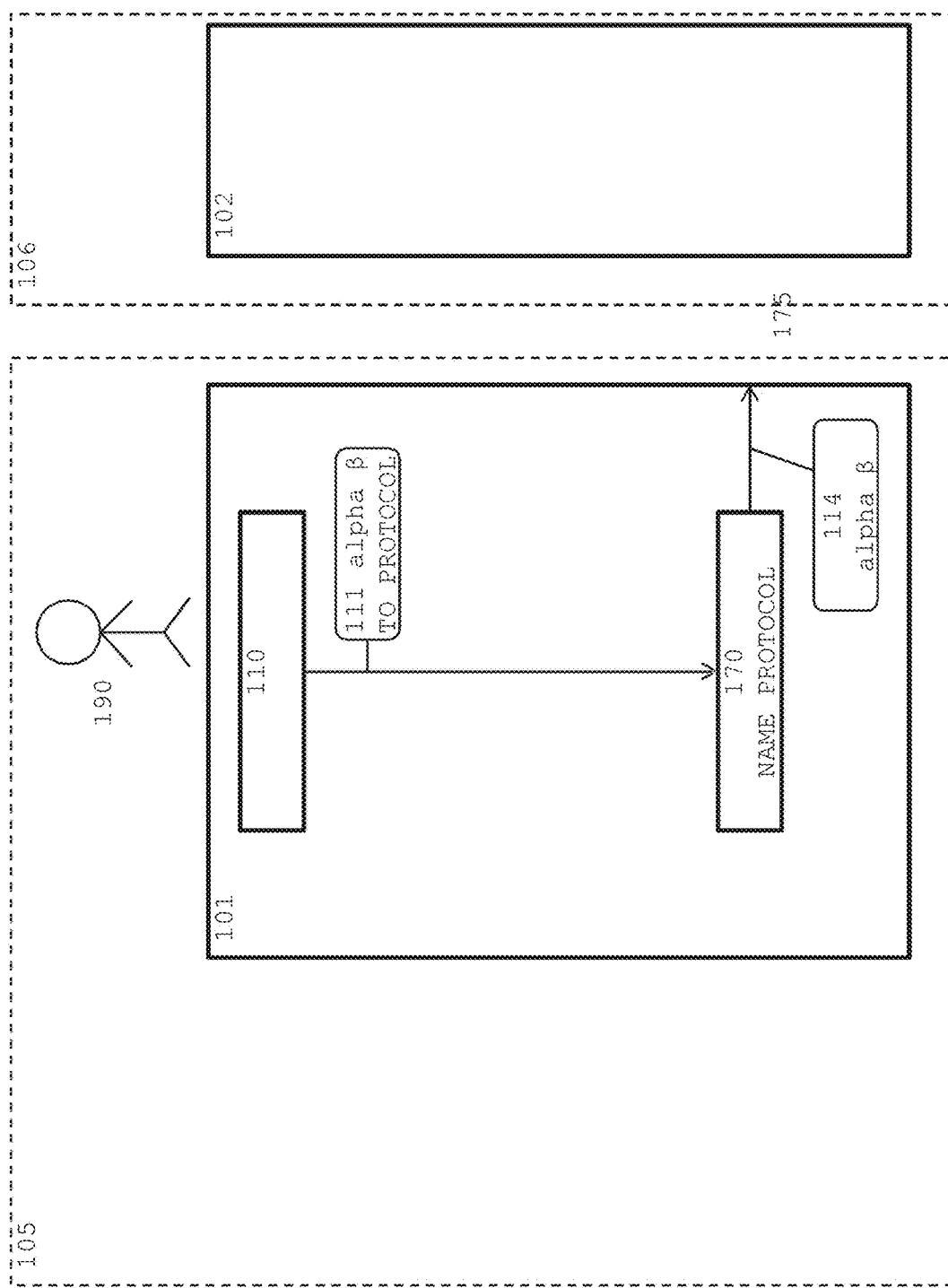

FIG. 1B illustrates first computer 101 and second computer 102 in a different setting. First computer 101 and second computer 102 are part of different computer groups 105 and 106, respectively. Groups 105 and 106 have data-access restrictions that are relative to each other and for that at least the following constraint is applicable: The computers in the computer groups 105 and 106 have different conventions to use data types. In group 105, second type data is allowed, in group 106, second type data is not allowed. This classification takes the risk into account.

Diversification of computing resources across multiple groups faces the risk that data leaves (or enters) the groups without complying with the restrictions. Since the protocols are assumed to be data-type agnostic, any communication between computers 101 and 102, can be a communication of data packets with second type data. Diversification of computing resources is not possible in this setting, this being problematic.

In the scenario, it would be problematic to keep the member names together with the item identifiers. In other words, the member names are risk data for computer 102. There is a risk that computer 102 forwards the names to some other destinations, including computers that are used for industrial espionage (being an example for a non-desired activity). The above-mentioned check for replacement or repair, by computer 102 could not be used.

Figure 1C:
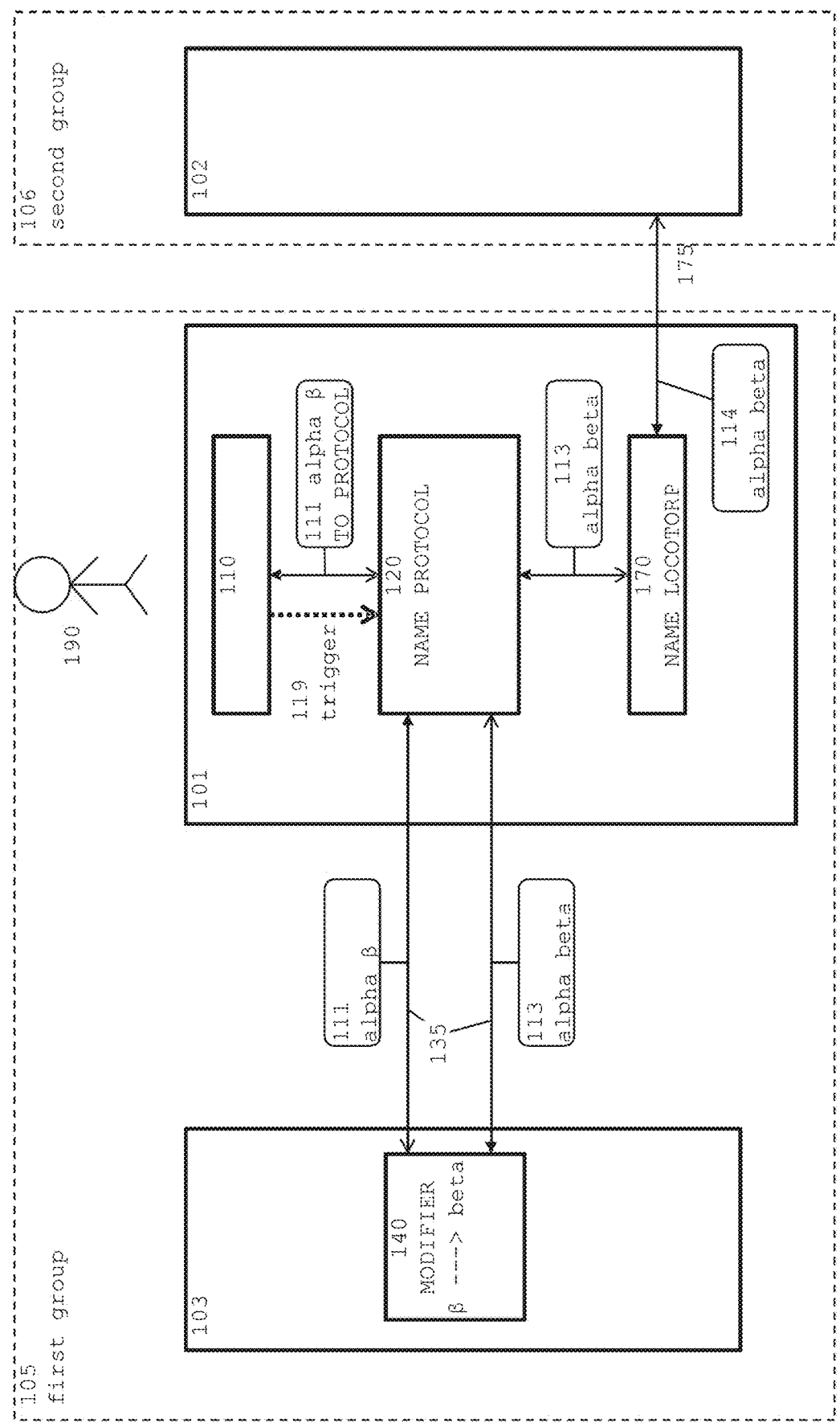

FIG. 1C illustrates first computer 101 and second computer 102 in communication via first protocol 175, and additionally illustrates auxiliary computer 103 in communication with first computer 101 via protocol 135. Auxiliary computer 103 modifies data packet 111 so that first computer 101 and second computer 102 no longer have to be located within the same access-restricted zone (e.g., zone protected by firewall).

In other words, the computers as arranged in FIG. 1C give a solution to the problem (of FIG. 1B): within the same group (i.e. first group 105) the conventions are being harmonized by modifier module 140 that runs on computer 103. Computer 103 can be physically separated from first computer 101 (but belongs to the same group 105). Modifier module 140 provides data conversion. Second type data is converted to first type data. Since first type data is no-risk data, computer 102 in group 106 can receive this (and process this).

Looking at implementations, protocols 135 and 175 can be different. First protocol 175 is used for inter-group communication (with first type data only), and second protocol 135 is used for intra-group communication (with first type data, but also with second type data being to-be-processed-data.).

In the scenario, it would be possible to keep the member names stored together with the item identifiers, but the member names are encrypted to character strings that do not cause an (activity) risk even if intercepted by a spy. Details will be explained in connection with the method, following next.

Figure 2A:
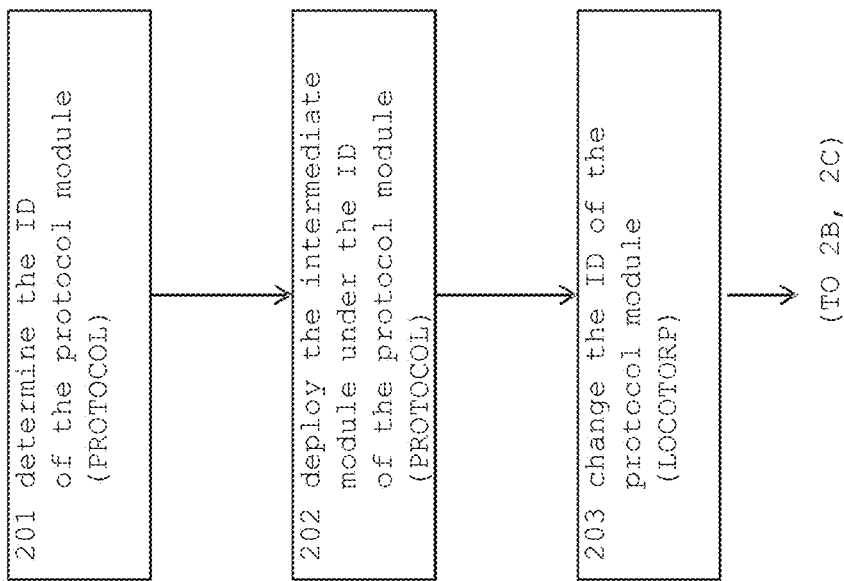
FIGS. 2A, 2B, and 2C illustrate flow-chart diagrams for a computer-implemented method for transmitting data between the first computer and the second computer.
Figure 2B:
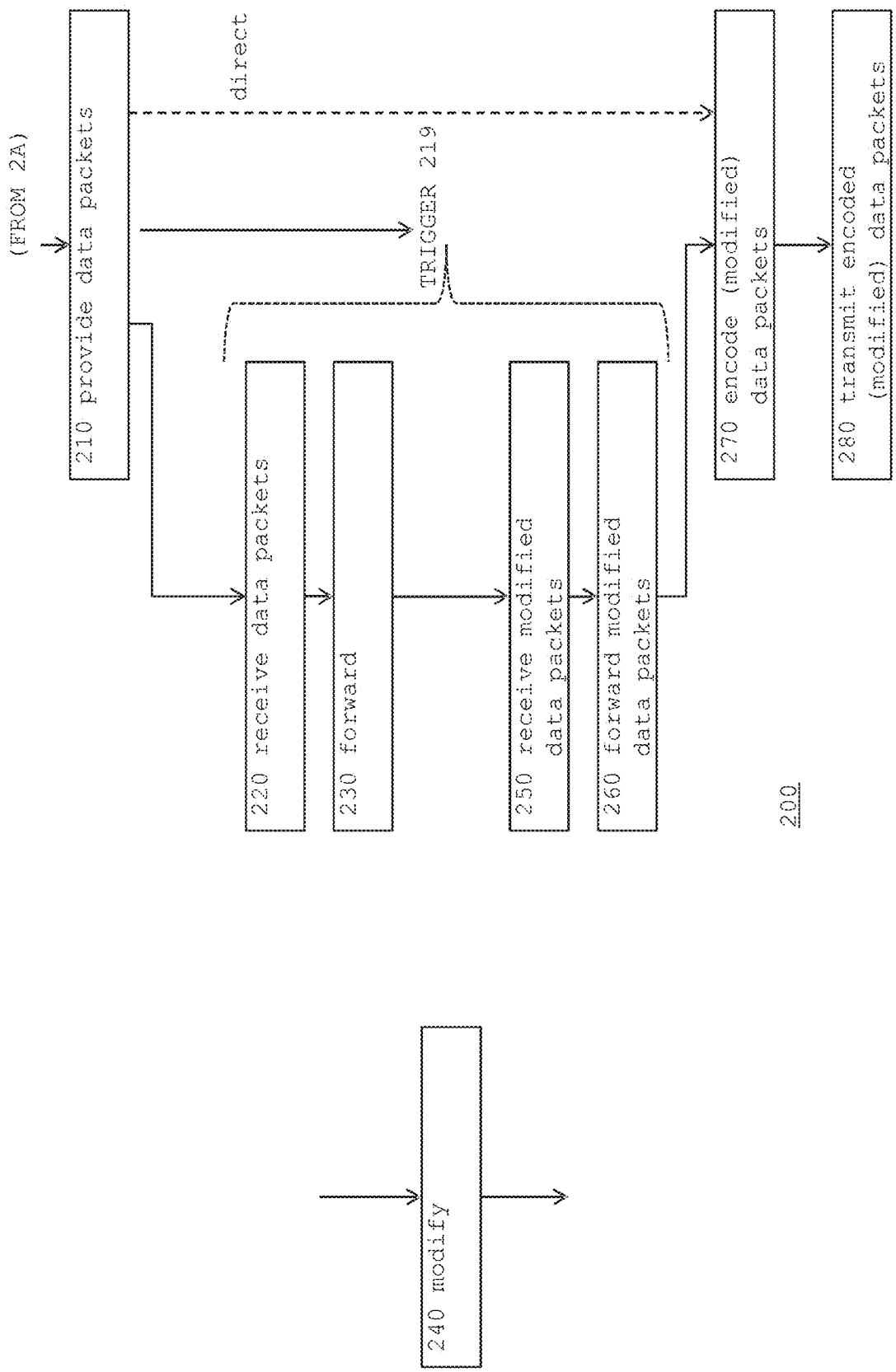
Figure 2C:
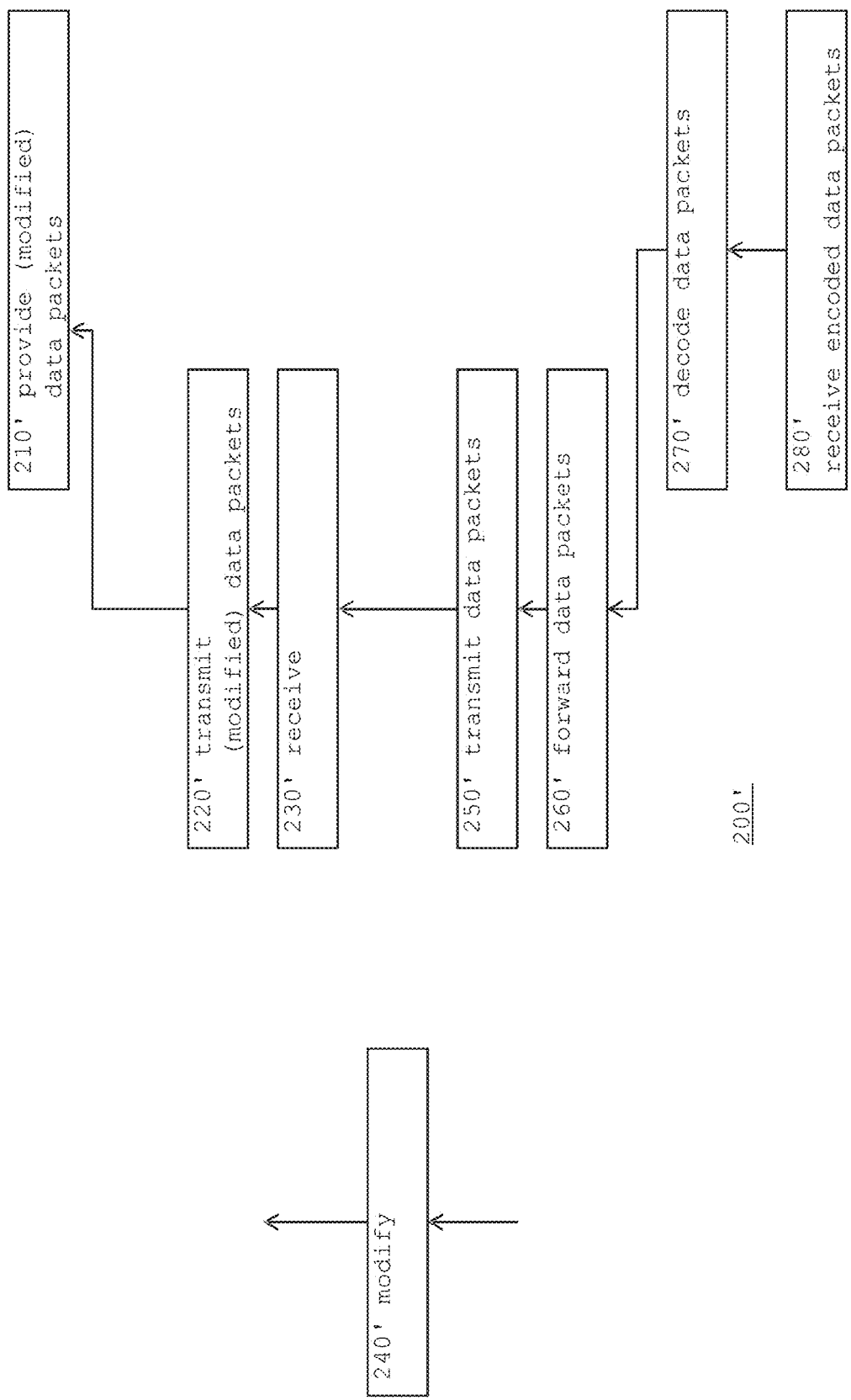

FIGS. 2A, 2B, and 2C illustrate flow-chart diagrams for a computer-implemented method for transmitting data between first computer 101 and second computer 102. First computer 101 is part of the computer system illustrated by FIG. 1C.

Most of the method steps are performed by first computer 101. FIG. 2A illustrates steps that first computer 101 performs initially, for example during a deployment phase.

From a different perspective and taking FIG. 1C into account as well, there is computer 101 for transmitting data 114 to further computer 102, using first protocol 175. As mentioned, computer 101 belongs to first computer group 105. Further computer 102 belongs to second computer group 106. Inter-group communication is restricted to communicating data packets 113, 114 that only contain first type data (alpha, beta). Computer 102 is characterized by comprising modules to perform the computer-implemented method, as explained.

FIG. 2B illustrates steps that first computer 101 perform periodically when data is actually being transmitted to second computer 102, that is the first direction.

With step 240, FIG. 2B also illustrates an action of auxiliary computer 103. FIG. 2C illustrates steps for first computer 101 operating in the second direction.

The separation into method steps in FIGS. 2B and 2C between the directions is convenient for illustration. Persons of skill in the art can combine the steps, by using techniques such as pipelining. In practical applications (cf. the scenario), the computers are likely to operate in both directions.

The description starts with FIG. 2A to explain preparatory measures. There is an assumption that a computer system as in FIG. 1B with computers 101 and 102 is available, and that auxiliary computer 103 (cf. FIG. 1B as well) is available as well (within first group 105, as in FIG. 1C).

Therefore, intermediate module 120 is deployed to first computer 101, and modifier module 140 is deployed to auxiliary computer 103. The order of that deployment does not matter, but deployment is only completed when the inter-module-communication is configured. An implementation will be explained by way of example with steps 201, 202 and 203. It is noted that those of skill in the art can implement the modules differently.

In step 201, computer 101 determines an identification ("ID") of protocol module 170. In the example, module 170 is identified as PROTOCOL, the upper-case letters symbolize any technical identification of the computer-instructions for module 170, for example, by directory and file names, by identification of a particular group of program libraries, among them direct-link libraries DLL or otherwise.

In step 202, computer 101 deploy intermediate module 120 under the identification of protocol module 170. In other words, intermediate module 120 will be deployed (i.e., the computer-instructions for the module) under the ID of module 170. This has the consequence that any module calling PROTOCOL reaches intermediate module 120.

In step 203, computer 101 changes the identification of protocol module 170. This measure ensures that identifications remain unique both for intermediate module 120 and for protocol module 170. Changing identification comprises that co-communicating modules are updated accordingly. In the example, the ID is changed from to PROTOCOL to LOCOTORP.

It is noted that identification change can be limited. For example, inside computer 101, protocol module 170 goes as LOCOTORP, but outside computer 101 (from the view point of computer 102), it goes as PROTOCOL. In other words, the module has two identities.

Having completed step 203, the flow continues with FIG. 2B or 2C, as the case may be.

The description continues with FIG. 2B by computer-implemented method 200 for transmitting data 114 from first computer 101 to second computer 102 using first protocol 175 (cf. FIG. 1C). As mentioned, first computer 101 belongs to first computer group 105 and second computer 102 belongs to second computer group 106. Inter-group communication is restricted to communicating data packets 113, 114 that only contain first type data (alpha, beta). Method 200 is implemented on first computer 101.

In step providing 210, client module 110 of first computer 101 provides data packets 111 that contain first type data (alpha) and second type data ($\beta$).

In step receiving 220, intermediate module 120 of first computer 101 receives data packets 111 from client module 110.

In step forwarding 230, intermediate module 120 forwards data packets 111 to modifier module 140 (of auxiliary computer 103), using second protocol 135. As mentioned, auxiliary computer 103 also belongs to first computer group 105.

In step receiving 250, intermediate module 120 receives modified data packets 113 from modifier module 140 (of auxiliary computer 103), again using second protocol 135. Modified data packets 113 contain first type data (alpha, beta) only. In the example (of FIG. 1C), data "alpha" remains first type data, but second type data "$\beta$" is now first type data "beta". (It is noted that "beta" is the no-risk version for that the content is hidden.)

In step forwarding 260, intermediate module 120 forwards modified data packets 113 to protocol module 170 (on first computer 101).

In step encoding 270, protocol module 170 encodes modified data packets 113 to encoded modified data packets 114. Protocol module 170 operates as explained in connection with FIG. 1A, except naming conventions (cf. FIGS. 1C, 2A, PROTOCOL/LOCOTORP) the module is not changed.

In step transmitting 270, protocol module 170 transmits encoded modified data packets 114 to second computer 102, using first protocol 175. There is no change in comparison to FIG. 1A.

For completeness, FIG. 2B also illustrates step modifying 240. The step is not performed by computer 101, but by auxiliary computer 103. (Rules that can be applied by computer 103 are to be explained below in connection with FIGS. 5-6, by way of example).

While data packets 111 (to/from intermediate module 120) still keep "alpha" and "β", modifier 140 (in computer 130) applies the conversion.

Looking at the scenario, second type is data risk data that—if it would arrive at the destination computer (here: computer 102) can cause activities that are not desired. The member names would be communicated to second computer 102, this is not desired. However, member names that are ciphered would not cause such activities. In such situations, modifier 140 applies a rule to convert the second type data to first type data by making the data non-usable by computer 102. (Making data non-usable is a general aspect and not limited to the particular scenario).

Much simplified and only for explanation, the description uses an anagram: "Alice" becomes "ecila" and "Robert" becomes "trebor". The de-cipher approach to obtain the clear names is not available to computer 102. Therefore, the data is not usable, and the risk is mitigated.

The scenario can be advantageous because the relation between the members (Alice, Robert) and the computer—equipment data remains, even within computer 102. The relation can be retrieved (in case of communication in the second direction).

Figure 5:
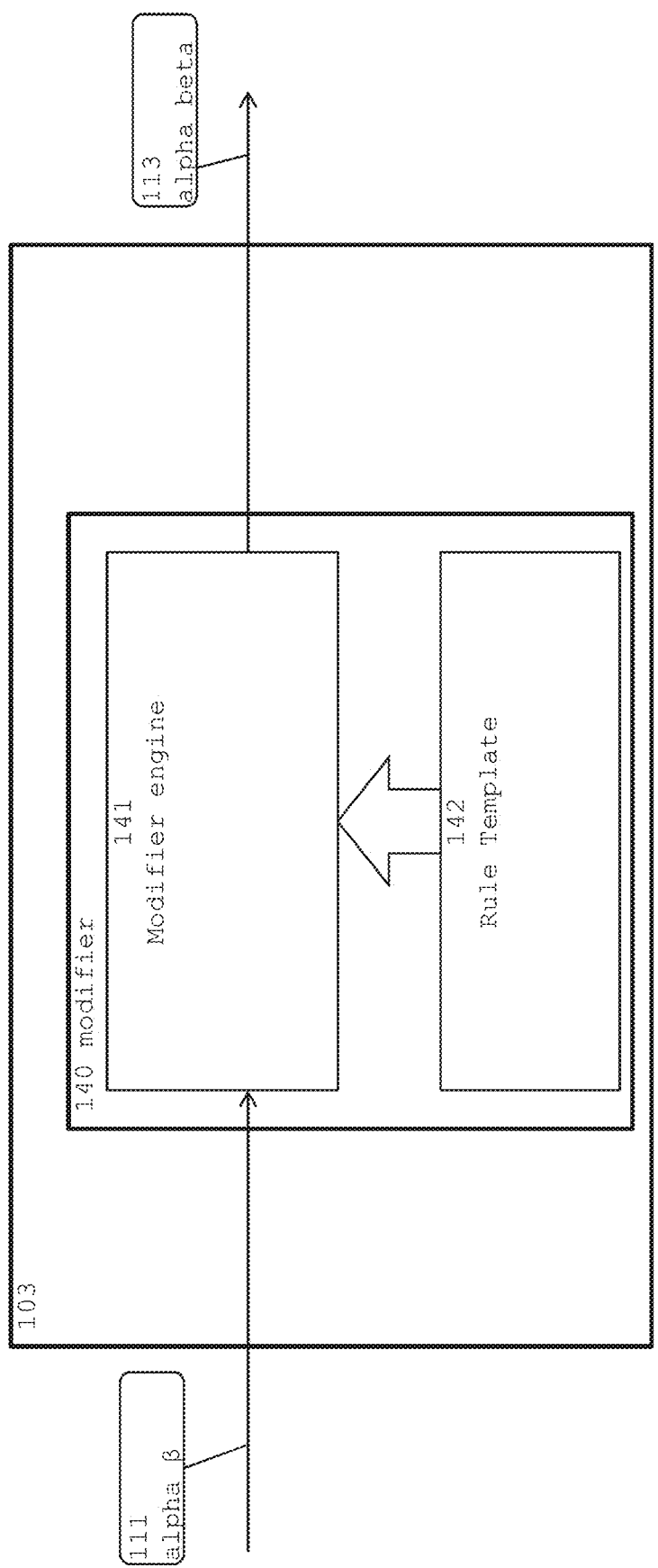
FIG. 5 illustrates a modifier module in an implementation with a modifier engine and with a rule template.
Figure 6:
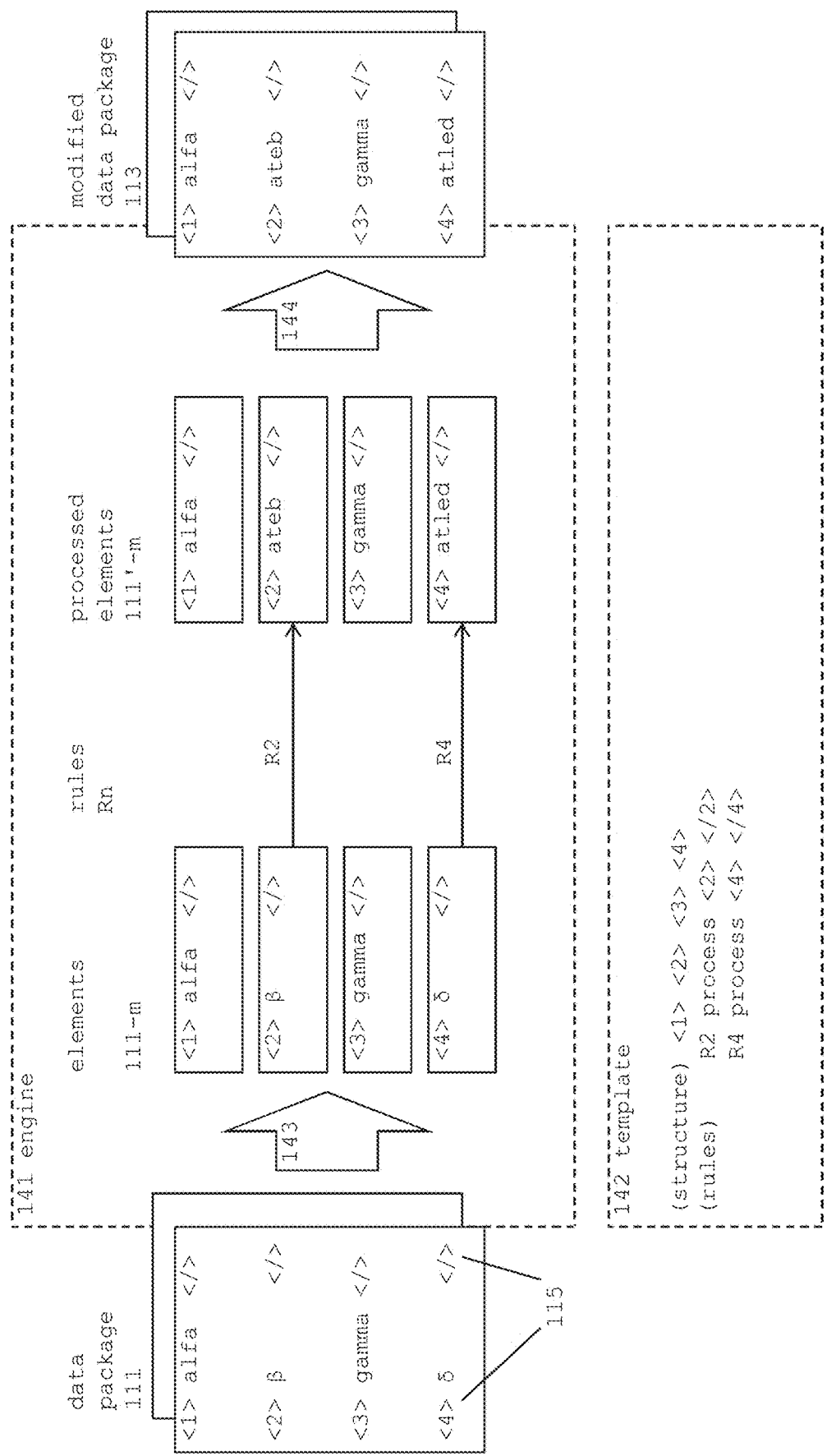
FIG. 6 illustrates the modifier module with more detail for exemplary data packets.

Person of skill in the art can apply more suitable rules, to be explained by example in connection with FIGS. 5-6.

As indicated by a curly bracket, steps 220, 230, 250, 260 (performed by intermediate module 120) in combination with an arrow, intermediate module 120 can perform these steps upon receiving 219 first activation trigger 119 from client module 110. Likewise, client module 110 can uses a de-activation trigger. This approach allows intermediate module 120 to control if data packets are to be modified or not.

Activation trigger 119 can comprise an identification of at least one functional instruction of protocol module 170, for example by comprising the name of a computer call (or file) for the instructions of module 170. Such a call can comprise using a reference or pointer to a direct-linked-library (DLL). DLLs are known to the person of skill in the art. Via activation trigger 119, intermediate module 120 is informed that a data transmission to computer 102 is in preparation.

In existing computers, the modification of client module 110 to implement the activation trigger only require minor changes, suitable for those of skill in the art. It is noted that an activation trigger would be implemented in combination with a deactivation trigger.

The description continues with FIG. 2C by computer-implemented method 200' for transmitting data 114 from second computer 102 to first computer 102 using first protocol 175 (cf. FIG. 1C) as well. This is the second communication direction. FIG. 2C can be considered as an inversion of FIG. 2B, with the flow going up, with the steps being re-labeled where appropriate.

In step receiving 280', protocol module 170 receives encoded data packets 114 from second computer 102, using first protocol 135.

In step decoding 270', protocol module 170 decodes encoded data packets 114 to data packets 113.

In step forwarding 260', intermediate module 120 forwards data packets 113 to protocol module 170.

In step transmitting 250', intermediate module 120 transmits data packets 113 to modifier module 140, using second protocol 135. Data packets 113 still contain first type data (alpha, beta).

In step receiving 230', intermediate module 120 receives data packets 111 from modifier module 140, using second protocol 135 again.

In step transmitting 220', intermediate module 120 transmits data packets 111 to client module 110.

In step providing 210, client module 110 provides data packets 111 (to user 190, cf. FIG. 1C) that contain first type data (alpha) and second type data (β).

For completeness, FIG. 2C also illustrates step modifying 240'. The step is not performed by computer 101, but by computer 103. Data is modified such that first type data is converted to second type data.

FIGS. 2A, 2B and 2C also illustrate a computer program and a computer program product. The computer program product—when loaded into a memory of a computer and being executed by at least one processor of the computer—performs the steps of the computer-implemented method. So in other words, the blocks in the figures illustrate that the method can be implemented by computers under the control of the program.

Shortly returning to the scenario, the computer equipment data remains unchanged, but the members are given their names back so that user 190 recognizes them as Alice and Robert.

Figure 3B:
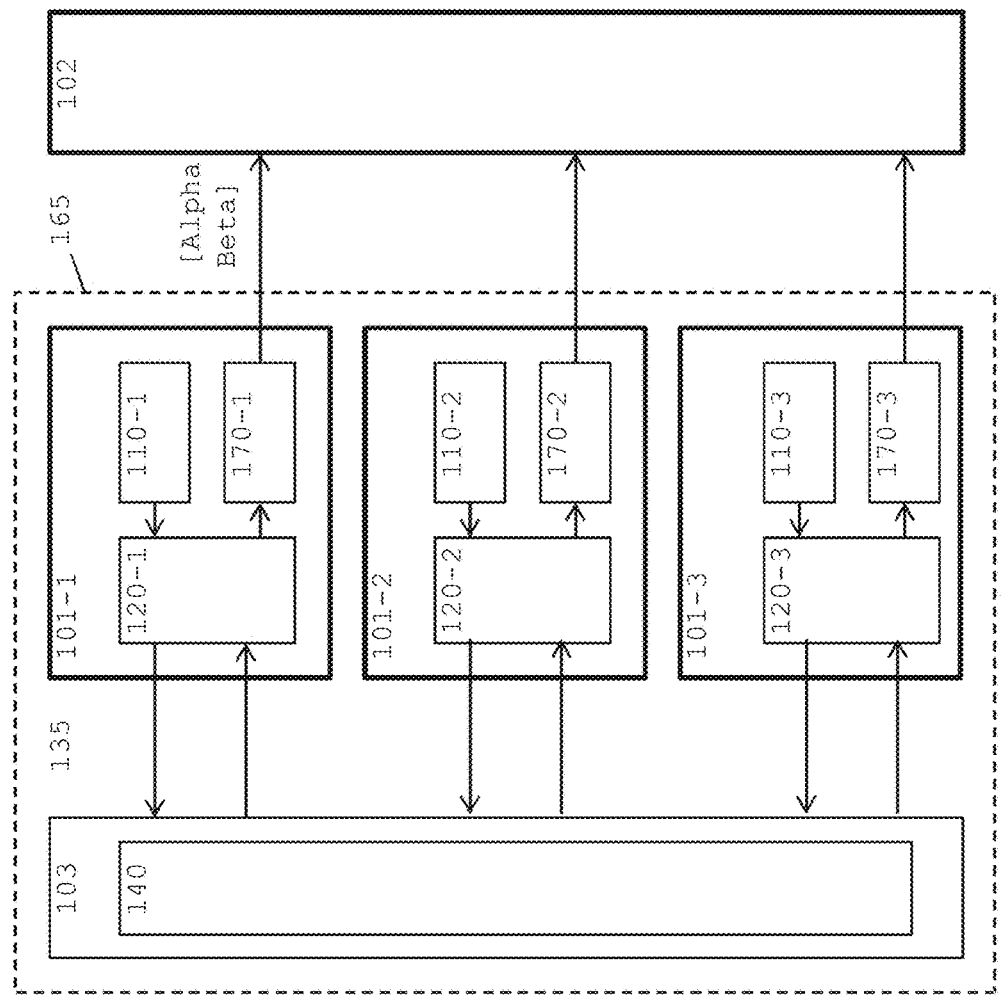
FIGS. 3A and 3B illustrate block diagrams of multiple computers and different access-restricted zones, to explain further usage scenarios.
Figure 3A:
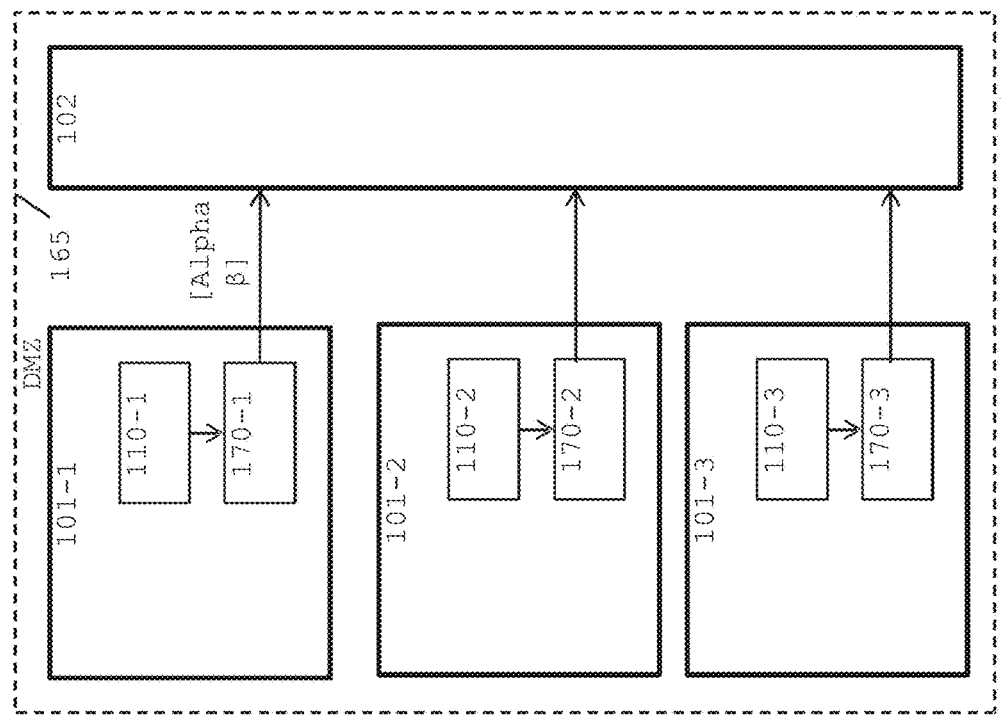

FIGS. 3A and 3B illustrate block diagrams of multiple computers and different zones, to explain further usage scenarios. While the above-simplified scenario focuses on the data types, the further scenarios look at pluralities of users and of first computers. For simplicity, pluralities are illustrated for N=3.

But taking the Alice/Robert scenario as a starting point, both members could operate separate first computers 101-1/101-2 to check with a single second computer 102 for equipment replacement opportunities.

As in FIG. 3A, first computers 101-1, 101-2 and 101-3 as well as computer 102 are located within zone 165 that is common for all of them. In the example, zone 165 is a secure zone, such as a so-called demilitarized zone (DMZ). Much simplified, second type data (i.e. the member names in plain letters, here given by the symbol β) is "positive" data (i.e., no-risk data) within that zone, but would be "negative data" (i.e. risk data) outside zone 165. The DMZ protects such risk data from leaving the zone. First computers 101-1, 101-2 and 101-3 have client modules 110-1, 110-2, 110-3 and protocol modules 170-1, 170-2, 170-3, respectively. FIG. 4A can be regarded as multi-client version of FIG. 1A.

As in FIG. 3B, first computers 101-1, 101-2 and 101-3 are located within zone 165. Restrictions prevent data from leaving the zone. But zone 165 is not common with computer 102. FIG. 3B illustrates the approach of FIG. 1C for the first computers. First computers 101-1, 101-2 and 101-3 have client modules 110-1, 110-2, 110-3 and protocol modules 170-1, 170-2, 170-3, respectively, but in addition with intermediate modules 120-1, 120-2, and 120-3, respectively. Naming conventions are applied accordingly. Auxiliary computer 103 has modifier module 140 as a single module. Those of skill in the art can distribute the modifying function to multiple modules, and even to multiple auxiliary computers, but the principle remains the same: there is an N-to-1 relation (multiple clients and one auxiliary computer). Measures to avoid collisions etc. are applicable as well.

The description now discusses some implementation aspects by way of example.

In implementations (cf. FIGS. 1C and 3B), some of the computers use programs that are commercially available from SAP SE, Walldorf, Germany. For example, computers 101 act as client computers that comprise a so-called "SAP-GUI" (a graphical user interface, usually installed on a computer), and computer 102 act as a server computer that executes SAP-software. More in detail, the SAP-GUI would be client module 110 that provides (step 210) data packets 111.

Both computers communicate via Secure Network Communications (SNC). The SNC is part of protocol 175. The person of skill in the art understands that SNC require the deployment of further modules, such as cryptographic libraries and others, depending on the level of protection that is desired for particular protection goals (e.g., authentication of users, data integrity, data privacy etc.). It is noted that SNC can be adapted to programming languages that are employed at the server (e.g., the ABAP language). Intermediate module 120 can be implemented with a DLL according to GSS-API (Generic Security Service Application Program Interface).

In other implementations, some of the computers use programs that are commercially available from other vendors, such as from Oracle Corporation, Redwood City, Calif., USA. The teachings are applicable likewise. Client module 110 would be implemented by the so-called "Oracle Instant Client". The communication between computers 101 and 102 (here, for example, in the function of a database) can use proprietary protocols (a protocol by Oracle, as protocol 175) that do not have to be modified.

Intermediate module 120 can be considered as a gateway module, or as in interception module that is deployed to computers that already implement client module 110 and protocol module 170. Using the identification of an existing module (i.e., of protocol module 170) simplifies the deployment because client module 110 would not have to be modified.

Regarding deployment, it is easy to change the way how data packets are modified. Programs running on auxiliary computer 103—such as modifier module 140—can be changed and/or re-deployed without changing module in computers 101 or 102.

As auxiliary computer 103 can be used by multiple computers 101 (cf. FIG. 3B), changes to modifier module 140 are applicable to data packets received from and sent to computers 101. Such an approach allows centralized control.

It is possible to update the modification (cf. step 240 in FIG. 2B, 240' in FIG. 2C) of the data packets by re-deploying modifier module 140 to computer 103.

However, there is a more practical way by having modifier module 140 implemented by a rule-based engine. Changes are can performed by changing the rule, but by keeping the programs of module 140 substantially unchanged. This will be explained in connection with FIG. 5.

But before, the description looks into time and space conditions under that auxiliary computer 103 is being used.

Figure 4:
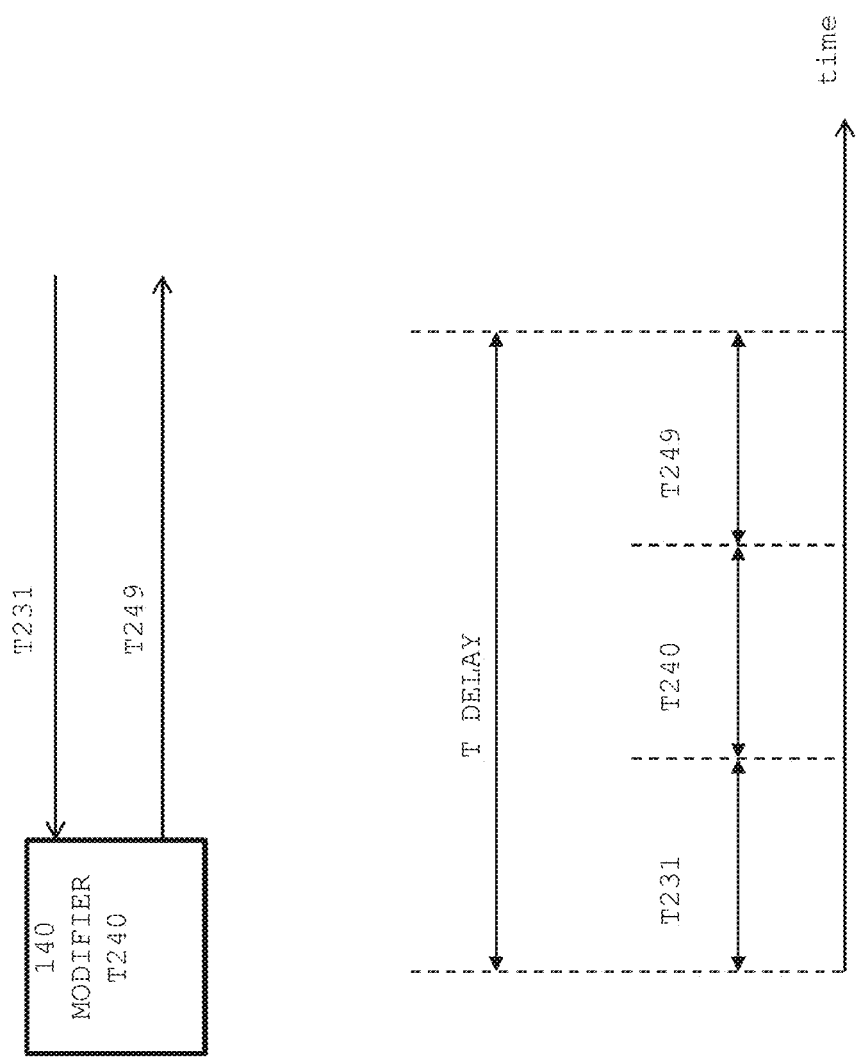
FIG. 4 illustrates a time diagram with timing aspects in the selection of the third computer.

FIG. 4 illustrates a portion of the block diagrams of FIG. 1C and FIG. 3B (above) in combination with a timing diagram (below). In scenarios where user 190 uses computer 101 (or computers) to interact with computer 102 (in a client/server setting), the delay introduced by the data conversion should be minimized.

Taking the first communication direction as example, T 231 stands for the time to forward a data packet to modifier module 140; T 240 stands for the time to modify it; and T 249 stand s for the time to forward the modified data packet. The overall time (T DELAY, being the sum) should be sufficiently short. For the second communication direction, the time periods can be summed up accordingly.

Signal propagation delay (e.g, T231, T 249) and data processing delay (e.g., T240) should be minimized. Using the Hypertext Transfer Protocol Secure (HTTPS) as second protocol 135 is appropriate. However, instead of HTTPS other protocols can be used as well.

In other words, and starting from method 200 (cf. FIG. 2A), there can be a further step of deploying modifier module 140 to auxiliary computer 103, wherein auxiliary computer 103 is communicatively coupled to first computer 101 via a network. To implement the deployment, auxiliary computer 103 is selected such that the following condition is in compliance: The delay time interval T DELAY with signal propagation delay and data processing delay is below the processing time for protocol module 170 to perform encoding 270 and transmitting 280 (or, decoding 270', receiving 280').

The delay time interval T DELAY can be calculated for one data packet 111 as the sum of:
1) network propagation delay T 231 for forwarding 230 data packet 111 to modifier module 140,
2) processing time T 240 for modifying 240 data packet 111 to modified data packet 113 by modifier module 140, and
3) network propagation delay T 249 prior to receiving 250 modified data packets 112.

In the figure, the time periods are illustrated with equal duration, this being a simplification.

The processing time for protocol module 170 to perform encoding 270 and transmitting 280 can be related to time intervals, such as acknowledgement time intervals between computers 101 and 102, and to maximal waiting times that are set for the interaction with user 190.

The person of skill in the art can select the location of auxiliary computer 103, within the network of group 105 (zone), such that the timing condition is in compliance. This approach is explained by two extrema:
a) Auxiliary computer 103 could be physically located in a company headquarter, physically located in a different continent as computer 101. Both computers 101 and 103 can be "behind" a common firewall or other access-restriction tool. However, it is likely that the condition is not complied with, but for a number of other reasons, such a cross-continent setting is not desired either (e.g., for data protection reasons).
b) As computer 101 and auxiliary computer 103 are located in group 105, it is further convenient to locate them in physical proximity (e.g., within the same floor of a building). The condition is likely in compliance.

In modifications of b), computer 103 can be an integral part of computer 101 (minimizing network delay), or modifier module 140 can be an integral part of intermediate module 120. Such an approach can be selected to optimized performance.

The person of skill in the art can select the suitable arrangement as a compromise from both extrema, for example, by placing auxiliary computer 103 into the same building (as computers 101).

To further reduce T DELAY (and other delays), it is possible to deploy multiple auxiliary computers (e.g., in each building). The compromise can keep the number of auxiliary computers low.

It is noted that there is no need to physically implement auxiliary computers 103 for the purpose as explained. Modifier module 140 can be deployed to computer hardware that is already existing (for example, in operation by the organization).

It is noted that computers 101 and 103 do not necessarily have a firewall in-between so that firewall delays are negligible.

The approach with using computer 103 in addition to first computer(s) 101 can be advantageous even if the quantity of the data (to be communicated, here within group 105) raises. Compliance with the conditions ensures data transmission at such speed that does not appear to user 190 as waiting time, especially in bi-directional communication between computers 101 and 102 (i.e. computer 102 sending a response).

The description now turns to modifier 140 (cf. FIGS. 1C, 3B) in an implementation that allows to change modification rules (for data conversion) easily.

FIG. 5 illustrates modifier module 140 in an implementation with modifier engine 141 and with rule template 142. Modifier engine 141 receives data packets 111 (from intermediate module 120, cf. FIGS. 1C, 3B), modifies it (cf. step 240 in FIG. 2B) and forwards modified data packets 113 to protocol module 170 (cf. FIGS. 1C, 3B). Illustration and description refer to the first communication direction only, but the teachings are applicable to the second direction well.

Prior to operation, modifier engine 141 can receive a rule from rule template 142 (cf. the up-going arrow). Using templates is optional.

FIG. 6 illustrates modifier module 140 (engine 141 and template 142) with more detail for exemplary data packets.

Data packet 111 is illustrated as the input of engine 141 (in the figures on the left side). Data packet 111 has a plurality of M original elements 111-$m$ that are arranged according to pre-defined data-structure 115. Using the concept of a "data-structure" is convenient for explanation, but it is noted that data-structure 115 is not necessarily a component of a data packet, although structural elements (such as tags) can be part of the data packet.

Data-structure 115 has at least two purposes:
a) to identify the borders or limits of data packet 111 (in the figures illustrated by a box) so that particular pieces of information communicated between the computers can be assigned to one particular data packet.
b) to identify individual non-overlapping portions (i.e. elements) within the data packet.

In the example, original data packet 111 uses structural tags (to open < >, to close </>). The opening tag <1> of the first element and the closing tag </4> of the last/fourth element indicate the borders. In the example, original data packet 110 could be written as <1> . . . </1><2> . . . </2><3> . . . </3><4> . . . </4>, with ellipses " . . . " being placeholders for content. For convenience, the figures illustrate the packets with line breaks, but in practical implementations these breaks are not required.

The example is simplified, data packet 111 could be structured otherwise, for example using one or more of the following:
 a file having individual elements separated by lines or symbols (e.g., end of line symbols;
 comma, colon, semicolon, etc.),
 a file having a pre-defined start convention to identify format or protocol, sometimes called "file signature" or "magic number" (e.g., "% PDF" for electronic documents in Portable Document Format (PDF)),
 a file having a pre-defined end convention,
 a payload in an TCP/IP packet (or combinations of packets),
 a command to a database with action and argument (e.g., "save X"),
 an operating system command (e.g., "dir *.txt"),
 an instruction to trigger a transaction in a business application,
 a structure with portions having a fixed length (e.g., "AAABBBCCC" being a structure with 3 portions having fixed length "3", "AABBBB" being a structure with 2 portions having the lengths "2" and "4"),
 structure with manufacturer or vendor specific protocols, like Messaging Application Programming Interface (MAPI), Exchange Web Services (EWS), protocols used by software-as-a-service providers such as SALESFORCE or SERVICE NOW,
 protocols like asynchronous JavaScript and XML (AJAX), JavaScript Object Notation (JSON) (other conventions are possible as well),
 data interchange or transfer protocols like Internet Message Access Protocol (IMAP), Simple Mail Transfer Protocol (SMTP), Electronic Banking Internet Communication Standard (EBICS).

In the example (that is simplified for illustration), data packet 111 comprises the following exemplary content: "alpha" in element 111-1, "β" in element 111-2, "gamma" in original element 111-3, and "δ" in original element 111-4. Modified data packet 111' comprises the following exemplary content: "alpha" in processed element 111'-1, "ateb" in processed element 111'-2, "gamma" in processed element 111'-3, and "atled" in processed element 111'-4. Processing can be "non-processing" (or "zero-processing"), in the example, elements 111-2/111'-2 and 111-4/111'-4 are processed (much simplified by using the anagram rule). The rules in the figures are simplified. The person of skill in the art can provide rules that are more complex. Non-processing can be explicitly given as a rule (e.g., for elements 111-1/111'-1 and 111-3/111'-3.

In terms of the above-introduced data-types, elements 1 and 3 are first type elements that remain first type elements, and elements 2 and 4 are second type elements that are converted to first type elements.

Looking at the Alice/Robert scenario, the member names are coded in elements 2 and 4. Computer 102 can process the data but processing the modified names (ecila, trebor) is substantially without risk (of leaking personal information, risk category (ii)).

Modified data packet 113 (illustrated at the output of engine 141) can have the same data-structure 115 as (unmodified) data packet 111. This may have a number of advantages: there is no need to modify data processing at the destination computer (i.e., computer 102). In other words, modifying data packets can be limited to modifying content, but keeping the data-structure unchanged.

It is however possible to modify data packets such that the data-structure changes as well. Rule templates 142 describes data modifications based on data-structure 115 (<1> . . . </1><2> . . . </2><3> . . . </3><4> . . . </4>). Persons of skill in the art know how to identify the data-structure of a data packet, so that at least some of the data packets have a matching rule template. Engine 141 accesses a rule template that is associated with data-structure 115 (or data packet 111) by identifying a particular data-structure and by selecting a particular template. In other words, there is a correspondence between template and data-structure. The person of skill in the art can implement a mapping (from identification to selection) without the need of further explanation herein. The example of FIG. 6 illustrates template 141 that fits the particular data-structure (<1> . . . </1><2> . . . </2><3> . . . </3><4> . . . </4>). Hence the rules in the particular template are applicable.

Practical implementations will use a plurality of rule templates, but it is noted that not every data-structure requires a rule template. Engine 141 can implement a general rule to forward a data packet without modifying it if there is no matching template. Therefore, it is not necessary to provide templates for all data-structures.

Since the data-structure is associated with the data packet (so that the engine knows the structure), modifier module 140 can separate the data packet 111 into its elements 111-*m*. This is illustrated by separator component 143 (that can be implemented as part of engine 141.

The rule template also provides representations of operations (i.e. rules) that specify the operation of the engine (to be performed for packets that have corresponding data-structures).

Modifier module 140 modifies data packet 111 by processing at least some of its elements 111-*m*. The description distinguishes the terms "modify" and "process" for simplicity of explanation, according to the granularity. But both terms stand for data processing.

In the example, template 142 provides processing rules R2 for element 111-2 and R4 for element 111-4. In other words, the rules are element-specific. In the example, R2 indicates to process the content between <2> and </2>, R4 indicates to process the content between <4> and </4>. In the illustrative example, the rule introduces a pseudonym by inverting the order of characters. In more realistic implementations, the rule calls for encryption/decryption etc. Having a rule for each element is convenient for explanation, but not necessary. A particular rule can be applicable to more than one element.

Processing in general can be specified (in the same template, or otherwise) in particular to encrypting. Looking at the content, some of the elements remain plain, some of the elements are encrypted to cipher-format.

Since a data-structure is associated with the data packet, modifier module 140 can combine the processed elements 111'-*m* (processed elements, un-processed elements) to modified data packet 113. This is illustrated by combiner component 144.

As explained above, intermediate module 120 can be considered as a gateway. In scenarios as in FIG. 3B, with multiple computers 102 (and multiple modules 102), modifier module 140 would be module that operates with a logic that is common to the gateways. Concentrating the logic to a single module (i.e., to module 140) can be advantageous in having data conversion in a consistent way.

The approach that uses the above-explained method can be part of a security concept for a computer system with computers in different zones (e.g., system with computers 101/103 in zone 165 and computer 102 outside that zone.

Figure 7:
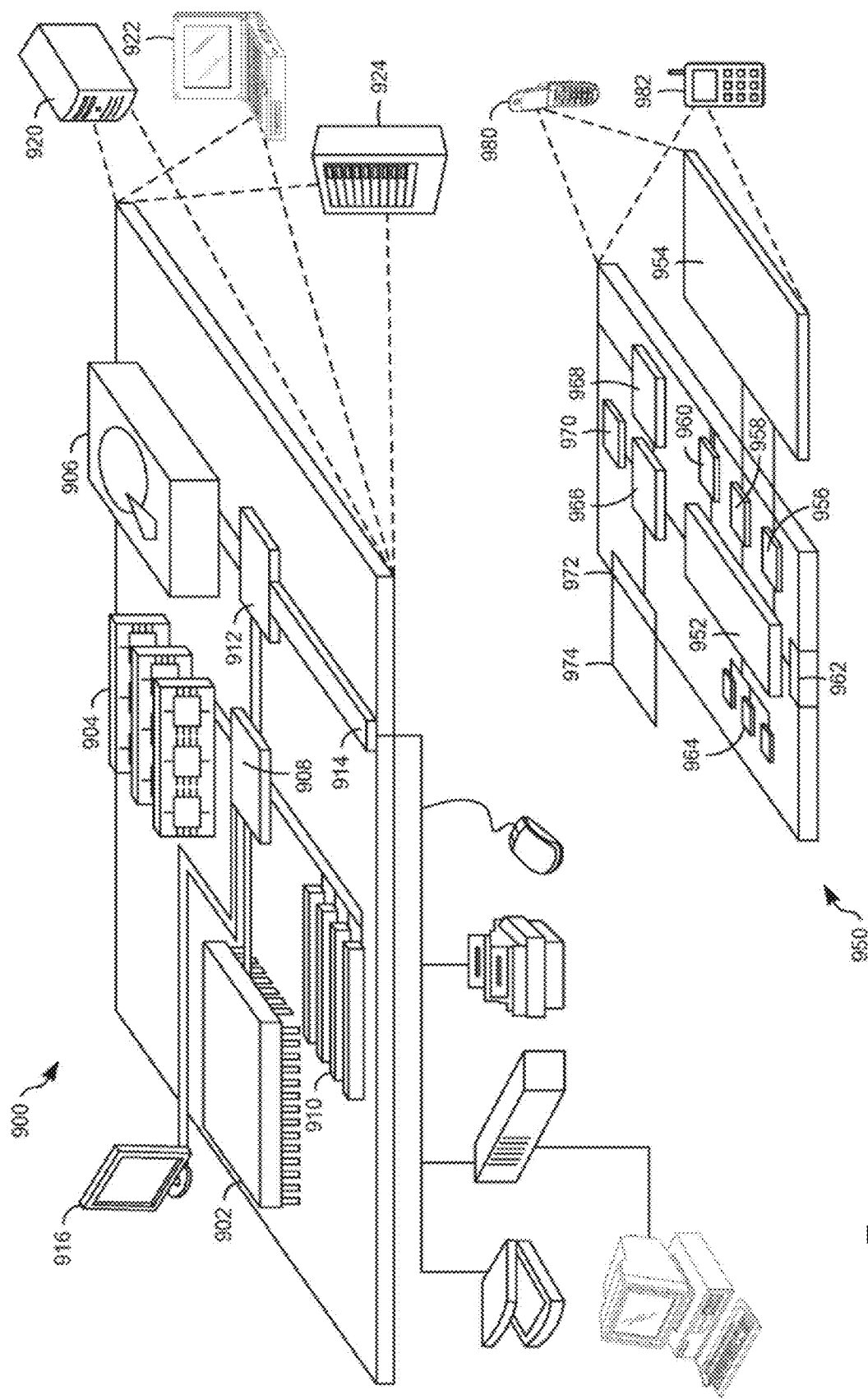
FIG. 7 illustrates a generic computer.

FIG. 7 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers.

Generic computing device 900 may correspond to the computer system explained above. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for transmitting data from a first computer to a second computer using a first protocol, wherein the first computer belongs to a first computer group and the second computer belongs to a second computer group, wherein inter-group communication is restricted to communicating data packets that only contain first type data, the method being implemented on the first computer, with the following steps:
   determining an identification of a protocol module, wherein the identification of the protocol module comprises the identification of a direct-linked-library with instructions that the first computer executes during execution of the steps encoding and transmitting;
   deploying an intermediate module under the identification of the protocol module;
   changing the identification of the protocol module;
   by a client module of the first computer, providing data packets that contain first type data and second type data;
   by the intermediate module of the first computer, receiving the data packets from the client module;
   by the intermediate module, forwarding the data packets to a modifier module of an auxiliary computer, using a second protocol, wherein the auxiliary computer also belongs to the first computer group;
   by the intermediate module, receiving modified data packets from the modifier module of the auxiliary computer, using the second protocol, wherein the modified data packets contain data of first type data only;
   by the intermediate module, forwarding the modified data packets to the protocol module on the first computer;
   by the protocol module, encoding the modified data packets to encoded modified data packets;
   by the protocol module, transmitting the encoded modified data packets to the second computer, using the first protocol; and
   deploying the modifier module to the auxiliary computer, wherein the auxiliary computer is communicatively coupled to the first computer via a network, and wherein the auxiliary computer is selected such that the following condition is in compliance:
   a delay time interval is below the processing time for the protocol module to perform encoding and transmitting, with the delay time interval being calculated for one data packet as the sum of:
   network propagation delay for forwarding the data packets, processing time for modifying the data packets to modified data packets by the modifier module, and
   network propagation delay prior to receiving the modified data packets.

2. The method according to claim 1, wherein the steps that are performed by the intermediate module of the first computer are performed upon receiving a first activation trigger from the client module.

3. The method according to claim 2, wherein the activation trigger comprises an identification of at least one functional instruction of the protocol module.

4. The method according to claim 1, wherein the second protocol is different from the first protocol.

5. The method according to claim 1, wherein the step providing the data packets is performed through interaction with a user.

6. The method according to claim 1, wherein providing data packets by the client module is performed by any of the following modules that are running on the first computer: SAP GUI, Oracle Instant Client.

7. The method according to claim 1, wherein the first computer group with the first computer and the auxiliary computer is protected against data packets leaving the group by a firewall.

8. The method according to claim 1, wherein the modifier module applies a rule to convert the second type data to first type data by making the data non-usable by the second computer.

9. The method according to claim 1, wherein inter-group communication is restricted to communicating data packets that only contain first type data, in contrast second type data being risk data.

10. A computer program product that, when loaded into a memory of a first computer and being executed by at least one processor of the computer, performs a computer-implemented method for transmitting data from the first computer to a second computer using a first protocol, wherein the first computer belongs to a first computer group and the second computer belongs to a second computer group, wherein inter-group communication is restricted to communicating data packets that only contain first type data, the method being implemented on the first computer, with the following steps:
   determining an identification of a protocol module, wherein the identification of the protocol module comprises the identification of a direct-linked-library with instructions that the first computer executes during execution of the steps encoding and transmitting;
   deploying an intermediate module under the identification of the protocol module;
   changing the identification of the protocol module;

by a client module of the first computer, providing data packets that contain first type data and second type data;

by the intermediate module of the first computer, receiving the data packets from the client module;

by the intermediate module, forwarding the data packets to a modifier module of an auxiliary computer, using a second protocol, wherein the auxiliary computer also belongs to the first computer group;

by the intermediate module, receiving modified data packets from the modifier module of the auxiliary computer, using the second protocol, wherein the modified data packets contain data of first type data only;

by the intermediate module, forwarding the modified data packets to the protocol module on the first computer;

by the protocol module, encoding the modified data packets to encoded modified data packets;

by the protocol module, transmitting the encoded modified data packets to the second computer, using the first protocol; and deploying the modifier module to the auxiliary computer, wherein the auxiliary computer is communicatively coupled to the first computer via a network, and wherein the auxiliary computer is selected such that the following condition is in compliance:

a delay time interval is below the processing time for the protocol module to perform encoding and transmitting, with the delay time interval being calculated for one data packet as the sum of:

network propagation delay for forwarding the data packets, processing time for modifying the data packets to modified data packets by the modifier module, and network propagation delay prior to receiving the modified data packets.

11. The computer program product according to claim 10, wherein the first computer performs the computer-implemented method such that the steps of the intermediate module of the first computer are performed upon receiving a first activation trigger from the client module.

12. A computer for transmitting data to a further computer, using a first protocol, wherein the computer belongs to a first computer group and the further computer belongs to a second computer group, wherein inter-group communication is restricted to communicating data packets that only contain first type data, the computer comprising:

at least one memory;
at least one hardware processor;
a client module adapted to:
  determine an identification of a protocol module, wherein the identification of the protocol module comprises the identification of a direct-linked-library with instructions that the first computer executes during execution of the steps encoding and transmitting,
  deploy an intermediate module under the identification of the protocol module,
  change the identification of the protocol module, and
  provide data packets that contain first type data and second type data;

the intermediate module adapted to receive the data packets from the client module and adapted to forward the data packets to a modifier module of an auxiliary computer, using a second protocol, wherein the auxiliary computer also belongs to the first computer group;

the intermediate module further adapted to receive modified data packets from the modifier module of the auxiliary computer, using the second protocol, wherein the modified data packets contain data of first type data only;

the intermediate module further adapted to forward the modified data packets to the protocol module;

the protocol module further adapted to encode the modified data packets to encoded modified data packets;

the protocol module further adapted to transmit the encoded modified data packets to the second computer, using the first protocol; and the modifier module further adapted to deploy to the auxiliary computer, wherein the auxiliary computer is communicatively coupled to the first computer via a network, and wherein the auxiliary computer is selected such that the following condition is in compliance:

a delay time interval is below the processing time for the protocol module to perform encoding and transmitting, with the delay time interval being calculated for one data packet as the sum of:

network propagation delay for forwarding the data packets, processing time for modifying the data packets to modified data packets by the modifier module, and network propagation delay prior to receiving the modified data packets.

13. The computer according to claim 12, wherein the intermediate module of the first computer performs the steps upon receiving a first activation trigger from the client module.

* * * * *